United States Patent
Tumuluri

(10) Patent No.: US 11,461,681 B2
(45) Date of Patent: Oct. 4, 2022

(54) SYSTEM AND METHOD FOR MULTI-MODALITY SOFT-AGENT FOR QUERY POPULATION AND INFORMATION MINING

(71) Applicant: Openstream Inc., Somerset, NJ (US)

(72) Inventor: Rajasekhar Tumuluri, Bridgewater, NJ (US)

(73) Assignee: Openstream Inc., Somerset, NJ (US)

( * ) Notice: Subject to any disclaimer, the term of this patent is extended or adjusted under 35 U.S.C. 154(b) by 184 days.

(21) Appl. No.: 17/070,529

(22) Filed: Oct. 14, 2020

(65) Prior Publication Data

US 2022/0114463 A1     Apr. 14, 2022

(51) Int. Cl.
*G06F 40/35* (2020.01)
*G06N 5/04* (2006.01)
*G06K 9/62* (2022.01)
*G06F 40/49* (2020.01)

(52) U.S. Cl.
CPC ........... *G06N 5/043* (2013.01); *G06F 40/49* (2020.01); *G06K 9/6293* (2013.01)

(58) Field of Classification Search
CPC ........ G06F 16/24532; G06F 16/24578; G06F 40/20; G06F 40/30; G06F 2203/0381; G06F 40/35
USPC ............... 704/1, 9; 707/723, 748, 765, 749
See application file for complete search history.

(56) References Cited

U.S. PATENT DOCUMENTS

| | | | |
|---|---|---|---|
| 8,589,161 B2 * | 11/2013 | Kennewick | G10L 15/30 704/257 |
| 10,276,160 B2 | 4/2019 | Andreas et al. | |
| 10,319,381 B2 | 6/2019 | Andreas et al. | |
| 10,402,488 B2 | 9/2019 | Chen et al. | |
| 10,515,625 B1 * | 12/2019 | Metallinou | G10L 15/26 |
| 10,586,530 B2 | 3/2020 | Liang et al. | |
| 10,643,601 B2 | 5/2020 | Hall et al. | |

(Continued)

OTHER PUBLICATIONS

Sharon Oviatt et al. The Handbook of Multimodal-Multisensor Interfaces, vol. 3, Language Processing, Software, Commercialization, and Emerging Directions, ISSN: 2374-6769, 2019 (815 Pages).

*Primary Examiner* — Martin Lerner
(74) *Attorney, Agent, or Firm* — Young Basile Hanlon & MacFarlane, P.C.

(57) ABSTRACT

Methods and systems for multi-modality soft-agents for an enterprise virtual assistant tool are disclosed. An exemplary method comprises capturing, with a computing device, one or more user requests based on at least one multi-modality interaction, populating, with a computing device, soft-queries to access associated data sources and applications, and mining information retrieved by executing at least one populated soft-query. A soft-query is created from user requests. A multi-modality user interface engine annotates the focus of user requests received via text, speech, touch, image, video, or object scanning. A query engine populates queries by identifying the sequence of multi-modal interactions, executes queries and provides results by mining the query results. The multi-modality interactions identify specific inputs for query building and specific parameters associated with the query. A query is populated and used to generate micro-queries associated with the applications involved. Micro-query instances are executed to obtain results.

20 Claims, 7 Drawing Sheets

(56) References Cited

U.S. PATENT DOCUMENTS

| | | |
|---|---|---|
| 10,713,288 B2 | 7/2020 | Andreas et al. |
| 10,762,892 B2 | 9/2020 | Rusak et al. |
| 2002/0135618 A1 | 9/2002 | Maes et al. |
| 2005/0131701 A1 | 6/2005 | Cross et al. |
| 2006/0287845 A1 | 12/2006 | Cross et al. |
| 2008/0235027 A1 | 9/2008 | Cross |
| 2010/0281435 A1* | 11/2010 | Bangalore ............... G06F 3/038 345/173 |
| 2012/0117051 A1* | 5/2012 | Liu ..................... G06F 16/9032 707/707 |
| 2013/0226892 A1* | 8/2013 | Ehsani .............. G06F 16/90332 707/706 |
| 2015/0348544 A1 | 12/2015 | Baldwin et al. |
| 2017/0352344 A1 | 12/2017 | Berg-Kirkpatrick et al. |
| 2018/0046851 A1* | 2/2018 | Kienzle ................... G06F 3/167 |
| 2018/0061408 A1 | 3/2018 | Andreas et al. |
| 2018/0114522 A1 | 4/2018 | Hall et al. |
| 2018/0203833 A1 | 7/2018 | Liang et al. |
| 2018/0226068 A1 | 8/2018 | Hall et al. |
| 2018/0246954 A1 | 8/2018 | Andreas et al. |
| 2018/0261205 A1 | 9/2018 | Liang et al. |
| 2018/0308481 A1 | 10/2018 | Cohen et al. |
| 2018/0329677 A1* | 11/2018 | Gruber ................... G06F 3/167 |
| 2018/0350349 A1 | 12/2018 | Liang et al. |
| 2018/0374479 A1 | 12/2018 | Hall et al. |
| 2019/0066660 A1 | 2/2019 | Liang et al. |
| 2019/0103092 A1 | 4/2019 | Rusak et al. |
| 2019/0103107 A1 | 4/2019 | Cohen et al. |
| 2019/0237061 A1 | 8/2019 | Rusak et al. |
| 2019/0244601 A1 | 8/2019 | Rusak et al. |
| 2019/0293462 A1* | 9/2019 | Choi .................... G06N 3/0454 |
| 2019/0295545 A1 | 9/2019 | Andreas et al. |
| 2019/0347321 A1 | 11/2019 | Chen et al. |
| 2019/0347523 A1* | 11/2019 | Rothberg ............. G06N 3/0454 |
| 2020/0193970 A1 | 6/2020 | Liang et al. |
| 2020/0335092 A1* | 10/2020 | Georgiou ................ G10L 15/16 |
| 2021/0012770 A1* | 1/2021 | Choudhary ............. G10L 15/22 |
| 2021/0064612 A1* | 3/2021 | Huang ................ G06F 16/9535 |
| 2021/0082398 A1* | 3/2021 | Hori ....................... G10L 15/02 |
| 2022/0164548 A1* | 5/2022 | Tumuluri ................ G06F 40/35 |

* cited by examiner

SYSTEM AND METHOD FOR MULTI-MODALITY SOFT-AGENT FOR QUERY POPULATION AND INFORMATION MINING

BACKGROUND

Enterprises have multiple applications such as customer relationship management (CRM), learning management systems (LMS), human-resource (HR), email and financial applications, and stored data in a variety of data stores. Each application permits the user to access the data and application services and respond to user requests or queries. Further, there are many publicly available data sources such as blogs, recommendation forums, news, social media, and the like, which are useful to address user requests. One problem associated with these applications or services is that the queries need to be specified in a pre-defined manner, and there is a lack of coordination in compiling or consolidating the responses from all the applications and data sources as a single view. Moreover, having the knowledge about each application and pre-defined formats is a challenge. Another problem with the typical application and data store access techniques is that queries cannot be easily refined, augmented and continued through multiple modes of interactions.

Virtual Assistants (VAs) are useful to assist humans in capturing, responding and managing their activities and tasks. VAs are typically deployed in devices such as smart phones, kiosks, tablets, enterprise systems, especially where typical users are allowed to access the information without knowing the technical details of the enterprise applications. Software applications or platforms for VAs understand the user requests that are in the form of natural language text or speech. However, due to the advancement of multi-modality interactions such as speech, text, touch, object recognition and the like, understanding the intention and focus of multi-modality user requests that arise continuously and on-the-fly would be desirable. Moreover, it would be desirable if the query responses are based on the context, device capabilities, and individual preferences and priorities.

Multi-modality queries are sometimes used to attempt to bridge the communication gap between humans and automated computing systems. In existing systems, various inputs are provided to the virtual assistants through a complicated menu driven selection process. In view of the above, there is a clear need to determine the intent and focus of the user requests that are based on multi-modality user interactions and respond to the requests by effectively populating and executing the associated queries without the use of complicated menus.

SUMMARY

In an aspect, a method for identifying user focus may include receiving sensor data. The sensor data may be received from one or more sensors. The sensor data may include a user request in multiple mode inputs. The multiple mode inputs may be associated with the one or more sensors to build a query. The method may include generating one or more soft-queries. The one or more soft-queries may be generated in real-time using the multiple mode inputs and one or more object encoders. The one or more soft-queries may be associated with one or more applications and one or more data stores. The method may include automatically determining a focused user intention from the multiple mode inputs. The method may include selecting a soft-query from the one or more soft-queries. The soft-query may be selected based on a rank associated with a respective application and a respective data store, a relevance associated with a respective application and a respective data store, or both. The method may include executing the selected soft-query against the respective data store and the respective application to generate a response. The method may include displaying the response in an interactive dashboard. The response may be a multiple mode response. The multiple mode response may include an audio signal that is complimentary to or associated with the displayed response.

In an aspect, a computing apparatus may include a processor, one or more sensors, and a memory. The memory may be configured to store instructions that when executed by the processor configure the apparatus to receive sensor data from the one or more sensors. The sensor data may include a user request in multiple mode inputs associated with the one or more sensors to build a query. The apparatus may generate one or more soft-queries in real-time. The apparatus may generate the soft-queries using the multiple mode inputs and one or more object encoders. The one or more soft-queries may be associated with one or more applications and one or more data stores. The apparatus may be configured to automatically determine a focused user intention from the multiple mode inputs. The apparatus may be configured to select a soft-query from the one or more soft-queries based on a rank associated with a respective application and a respective data store, a relevance associated with a respective application and a respective data store, or both. The apparatus may be configured to execute the selected soft-query against the respective data store and the respective application to generate a response. The apparatus may be configured to display the response in an interactive dashboard. The response may be a multiple mode response. The multiple mode response may include an audio signal that is complimentary to or associated with the displayed response.

BRIEF DESCRIPTION OF DRAWINGS

The various embodiments of the disclosure will hereinafter be described in conjunction with the appended drawings, provided to illustrate, and not to limit, the disclosure, wherein like designations denote like elements, and in which.

DETAILED DESCRIPTION

Figure 1:
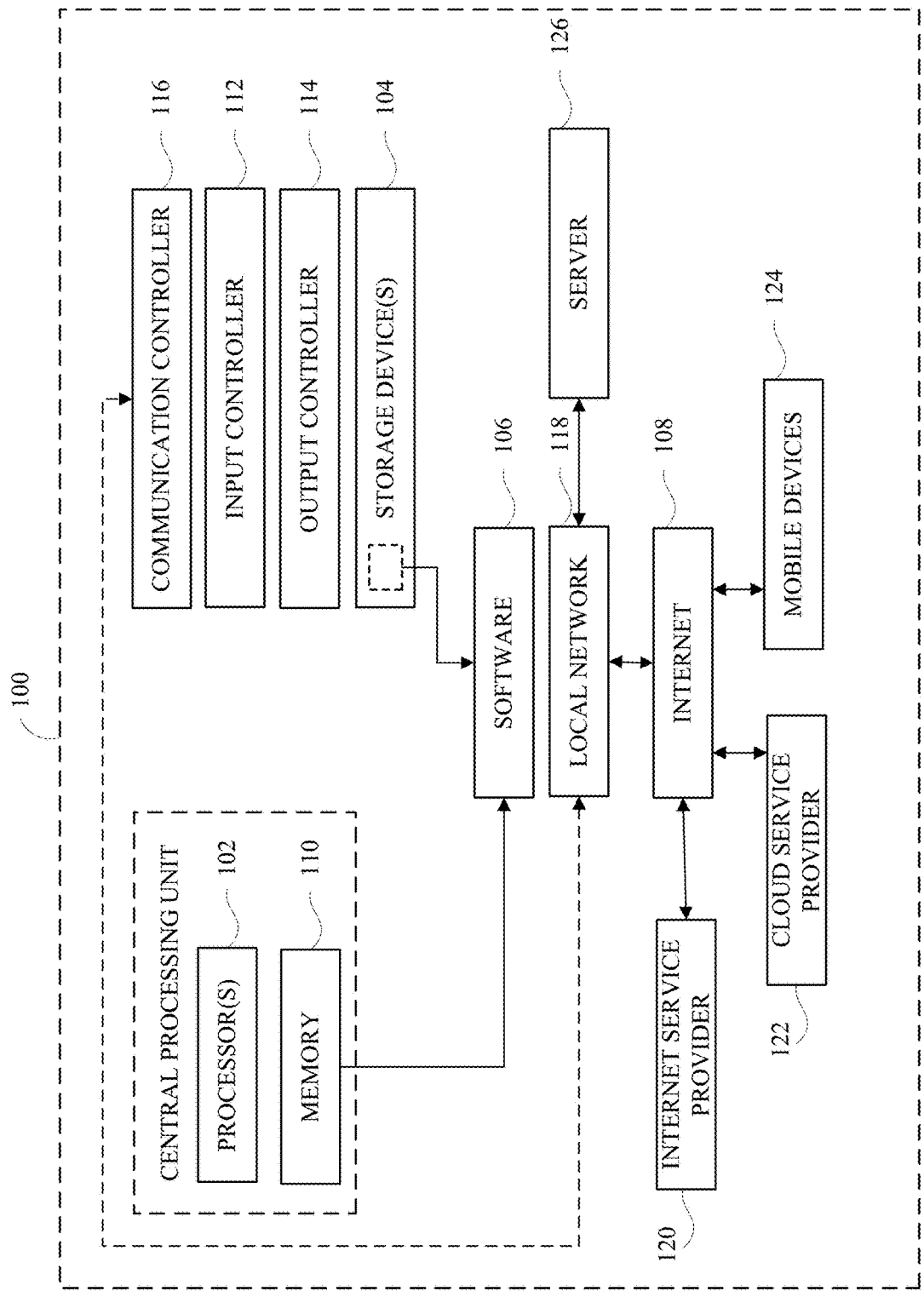
FIG. 1 is a block diagram of an example of a computing device in accordance with embodiments of this disclosure.

In the disclosed embodiments, a multi-modality based approach to automatically querying, retrieving, and providing the responses to a sequence of user requests as multi-modality inputs is described. Throughout this application, multi-modality inputs may also be referred to as multiple mode inputs. The embodiments described herein are configured to provide convenience to the users to interact with the system in a natural way, for example through speech (i.e., voice input), texting (i.e., text input), touch or gesture input, image input, object drawing input, scanned object input, motion input, location input, or any combination thereof. The systems described herein may be configured to detect and localize the modality-event-context patterns by analyzing the multi-modality inputs given by a specific user. In one approach, heuristics methods may be used to mine the relationship between different modality inputs. Another approach may use natural language processing, computer vision, and machine learning approaches to discover the intent of user requests and focus of the query to access and retrieve the information from one or more enterprise applications and various data stores. While the embodiments described herein may be susceptible to various modifications and alternative forms, specific embodiments thereof are shown by way of example in the drawings and will be described in detail below. It should be understood, however that these examples not intended to limit the embodiments to the particular forms disclosed, but on the contrary, the disclosed embodiments cover all modifications, equivalents, and alternatives falling within the spirit and the scope of the disclosure as defined by the appended claims.

The method steps have been represented, wherever appropriate, by conventional symbols in the drawings, showing those specific details that are pertinent to understanding the embodiments so as not to obscure the disclosure with details that will be readily apparent to those of ordinary skill in the art having benefit of the description herein.

The terms "comprises," "comprising," or any other variations thereof, are intended to cover a non-exclusive inclusion, such that a process or method that comprises a list of steps does not include only those steps but may include other steps not expressly listed or inherent to such process or method. Similarly, one or more elements in a system or apparatus proceeded by "comprises . . . a" does not, without more constraints, preclude the existence of other elements or additional elements in the system or apparatus.

The features of the present embodiments are set forth with particularity in the appended claims. Each embodiment itself, together with further features and attended advantages, will become apparent from consideration of the following detailed description, taken in conjunction with the accompanying drawings.

The disclosed embodiments describe retrieving and organizing information from a set of applications, data sources, or both, by performing various steps as is described in details in forthcoming sections. For the sake of explanation and understanding, reference is drawn towards a typical search query related to finding restaurants in a designated area on a map, where the process heavily relies on multi-modality technology for converging speech, text, images, touch, language, and the like. Success of such a multi-modality platform mainly depends on how good and relevant the obtained results are.

In reference to the above, a user query may have one or more modalities such as speech, text, images, scanned objects, touch, or the like. From a technical point of view, these inputs may be obtained from one or more sensors and can be seen as analogous to sensor data and a corresponding soft-query. The soft-query may apply to a variety of data being referred to in the present disclosure and are used in the description that follows below.

FIG. 1 is a block diagram of a system that comprises a computing device 100 to which the present disclosure may be applied according to an embodiment of the present disclosure. The system includes at least one processor 102, designed to process instructions, for example computer readable instructions (i.e., code) stored on a storage device 104. By processing instructions, processor 102 may perform the steps and functions disclosed herein. Storage device 104 may be any type of storage device, for example, but not limited to an optical storage device, a magnetic storage device, a solid-state storage device, or a non-transitory storage device. The storage device 104 may contain software 106 which may include a set of instructions (i.e. code). Alternatively, instructions may be stored in one or more remote storage devices, for example storage devices accessed over a network or the internet 108. The computing device 100 also includes an operating system and microinstruction code. The various processes and functions described herein may either be part of the microinstruction code, part of the program, or a combination thereof, which is executed via the operating system. Computing device 100 additionally may have memory 110, an input controller 112, and an output controller 114 and communication controller 116. A bus (not shown) may operatively couple components of computing device 100, including processor 102, memory 110, storage device 104, input controller 112, output controller 114, and any other devices (e.g., network controllers, sound controllers, etc.). Output controller 114 may be operatively coupled (e.g., via a wired or wireless connection) to a display device such that output controller 114 is configured to transform the display on display device (e.g., in response to modules executed). Examples of a display device include, and are not limited to a monitor, television, mobile device screen, or touch-display. Input controller 112 may be operatively coupled via a wired or wireless connection to an input device such as a mouse, keyboard, touch pad, scanner, scroll-ball, or touch-display, for example. The input device is configured to receive input from a user and transmit the received input to the computing device 100 via the input controller 112. The communication controller 116 is coupled to a bus (not shown) and provides a two-way coupling through a network link to the internet 108 that is connected to a local network 118 and operated by an internet service provider (ISP) 120 which provides data communication services to the internet 108. A network link may provide data communication through one or more networks to other data devices. For example, a network link may provide a connection through local network 118 to a host computer, to data equipment operated by the ISP 120. A cloud service provider 122 and mobile devices 124 provide data store and transfer services to other devices through internet 108. A server 126 may transmit a requested code for an application through internet 108, ISP 120, local network 118 and communication controller 116. FIG. 1 illustrates computing device 100 with all components as separate devices for ease of identification only. Each of the components shown in FIG. 1 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be implemented as one or more servers, for example a farm of networked servers, a clustered server environment, or a cloud network of computing devices.

An embodiment describes a method of soft-query population for a virtual assistant tool. A user provides (210) a set of inputs. These inputs may be provided by the user through a multi-modal interface based computer implemented tool. These inputs are, but not limited to, images, speech, text, touch, scanned object, and video.

Figure 2:
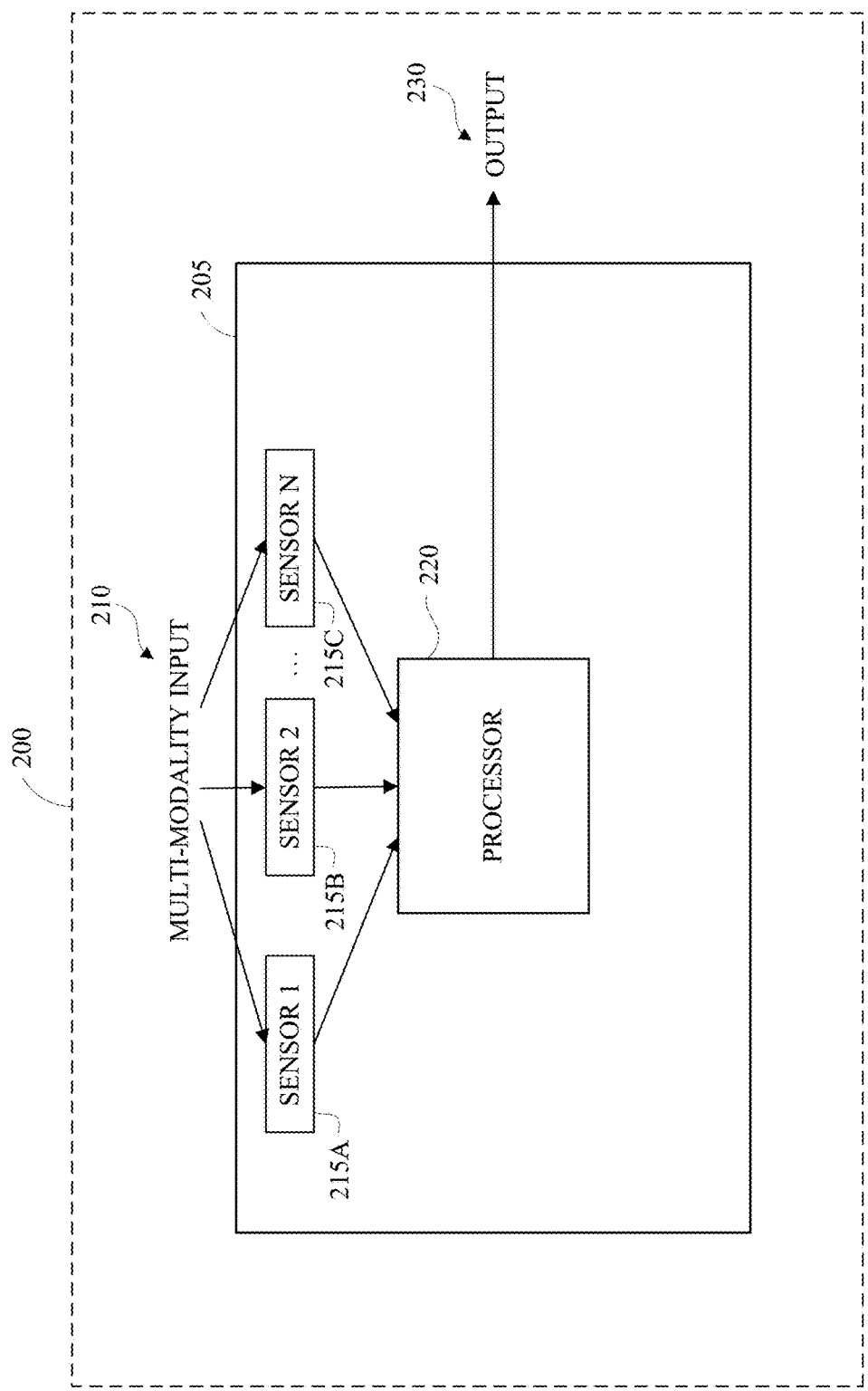
FIG. 2 is a block diagram of an example of a system in accordance with embodiments of this disclosure.

FIG. 2 is a block diagram of an example of a system 200 in accordance with embodiments of this disclosure. In this example, a computing device 205 may include a processor 220. The processor 220 may be a multi-modal processing component. In some embodiments, the processor 220 may be implemented with a soft-agent. The soft-agent may be a software component that is configured to allow users to provide inputs via a multi-modality interface. Computing device 205 may be configured to receive a multi-modality input 210, for example via a multi-modal interface. The multi-modality input 210 may be obtained by one or more sensors 215A-215C. Any number of sensors may be implemented, and three sensors are shown in FIG. 2 for simplicity and clarity. The one or more sensors 215A-215C may be any type of sensor including, for example, an interactive touch display, a microphone, a global positioning system (GPS) sensor; an accelerometer, or a biometric sensor. In an example, sensor 215A may be a microphone, sensor 215B may be an interactive touch display, and sensor 215C may be an accelerometer.

The multi-modality input 210 may comprise free-form text input in the form of a question or a statement. Alternatively, or in addition to, the multi-modality input 210 may comprises audio input such as speech or voice input, some other form of multi-modality input such as an image, video, touch, scanned object, gesture, or any combination thereof. In an example, the computing device 205 may be configured to processes the multi-modality input 210 using the processor 220 by a soft-agent to produces an output 230. Output 230 may include, for example, a search query that can be sent to a web data store stored on one or more other computing devices (not shown) for processing. Alternatively, processing of search queries may be performed by the processor 220 of the computing device 205. As another example, the output 230 may include a display of ordered search results obtained in response to a search query. The output 230 may include a multi-modality output that includes a display for an interactive dashboard, a text-to-speech audio output, an audible or haptic alert or notification, or any combination thereof.

When a user is registered with the Virtual Assistant System 200, the application and data stores that are allowed by the user are configured for accessing and retrieving information from those applications and data stores. The Virtual Assistant System 200 may be configured to provide different user-access permission depending the user role and entitlements. Access to specific application and specific data stores is given to a user based on the user roles. When a new user is registered, the administrator may configure the access permission as per the user role, which enables the user to access the applications and data stores that are allowed for that specific role. Once the administrator approves the permissions, the user may access and retrieve the information from the allowed applications and data sources. One or more roles may be assigned to a user.

Figure 3:
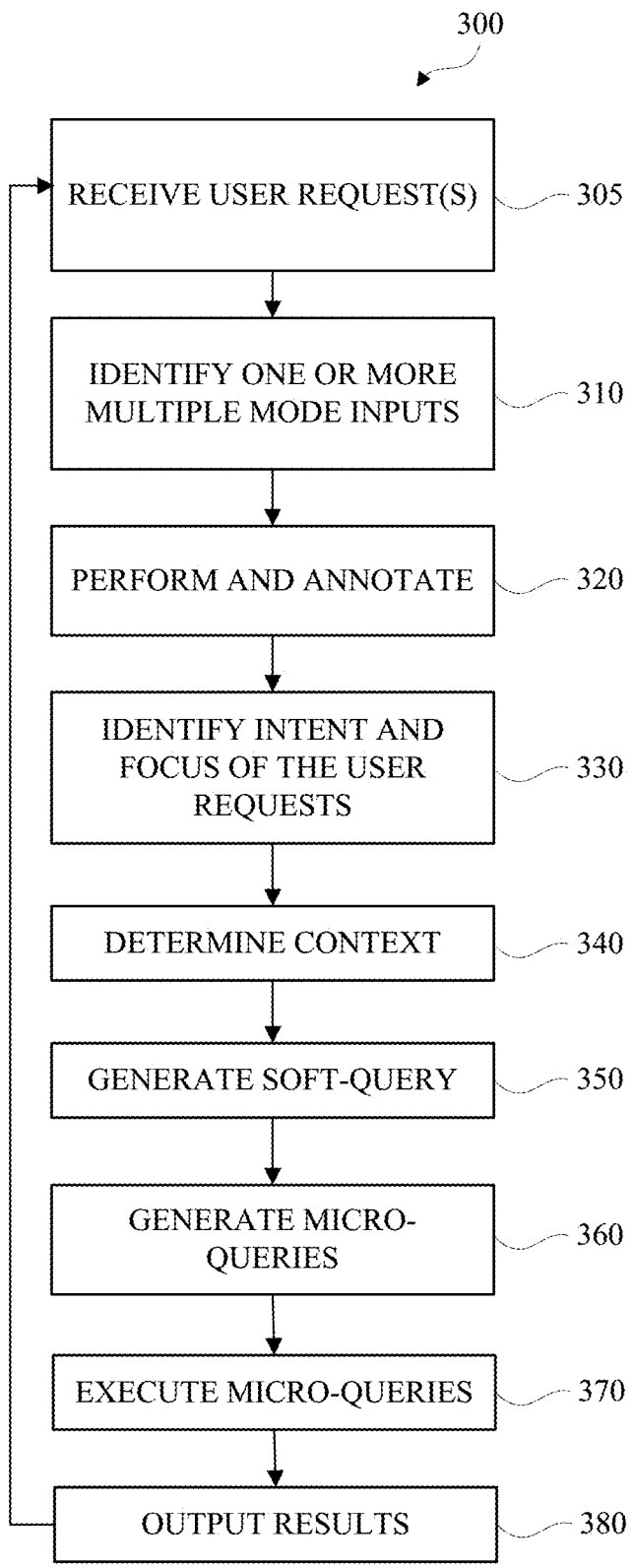
FIG. 3 is a flowchart of an example of a method for processing a multi-modality input with a run-time virtual assistant engine in accordance with embodiments of this disclosure.

FIG. 3 is a flowchart of an example of a method 300 for processing a multi-modality input with a run-time virtual assistant engine in accordance with embodiments of this disclosure. As shown in FIG. 3, the method 300 includes receiving 305 one or more user requests. The one or more user requests may form multi-modality inputs to provide an output, according to an example embodiment. The multi-modality input may include one or more inputs received via a multi-modal user interface, for example a graphical user interface with advanced user experience services, a microphone, an accelerometer, a GPS sensor, a biometric sensor, or any combination thereof. The method 300 may be performed by a soft-query building and executing service that is implemented in a machine-accessible and readable medium that is accessible over a network. The soft-query building and executing service may be implemented on processor 102 shown in FIG. 1 or processor 220 of FIG. 2, for example. The network may be wired, wireless, or a combination of wired and wireless.

The method 300 includes identifying 310 one or more multiple mode inputs from the user requests. The multiple mode inputs may include inputs from an interactive touch display, a microphone, a GPS sensor; an accelerometer, a biometric sensor, or any combination thereof.

The method 300 includes annotating 320 the inputs. Annotating 320 the inputs includes tagging the inputs and determining the relationships between the modalities. For example, the user requests (i.e., queries) may include one, two, or more input modalities obtained from different sensors such as a hand gesture and speech. One or more relationships between the hand gesture and speech are determined, and the modalities and relationships are then tagged (i.e., annotated) and associated with the user request. The determined relationships between modalities in the user request (i.e., input query) may be used for further processing of the query. The annotation may be performed by the soft-agent with a set of predetermined rules that may be driven by modality-event-context patterns. In an example, the system may tag restaurants located in a specified region in the geography map with restaurant tags.

The method 300 includes identifying 330 the intent and focus of the user requests to generate a focused query associated with terms, topics and gestures in the multi-modality input. Heuristic methods may be used to mine the relationship between different modality inputs. Natural language processing, computer vision, and machine learning approaches may be used to determine the intent of the user requests and focus of the query to access and retrieve the information, for example, from enterprise applications, various data stores, or both. In an example, the system may be configured to identify an object drawn on a map using a finger touch input as a potential geometrical region.

Identifying 300 the user intent may include determining a sequence of the inputs. For example, historical data (i.e., conversations) with labeled intents may be used for training natural language processing (NLP), computer vision (CV), and machine learning (ML) models for modeling the intent behavior. One or more of a Named Entity Recognition, Long Short Term Memory (LSTM), Support Vector Models (SVM) may be used to identify the user intent. The Name Entity Recognition may be used for identifying the entities in the text portion of the query. LSTM may be used for modeling the sequence portion of the query. SVM may be used for object detection and recognition in images, videos, or both.

The method 300 includes determining 340 the context of the multi-modality input. For example, for the speech query "show me the restaurants in this" and then a region is drawn on the map, the method 300 determines the context by relating "this" in the speech query with the object drawn in the subsequent input. The system then identifies the modality-event-context patterns from the multi-modality query. For instance, in the above example, the pattern comprises touch as modality, find restaurant as an event, and geometric region (location) as context. The sequence of the inputs may be used to determine the context of the multi-modality input.

The method 300 includes generating 350 a soft-query. The soft-query may be based at least in part on the multi-modality input based on the patterns identified. The soft-query is a query that is generated to address inputs received or obtained in more than one modality. Since the user request is a multi-modality input, the generation of the soft-query may determine the user intent, context, or both, from the sequence of inputs and queries. For example, a voice input of "this" in conjunction with a map may refer to a location context and a voice input of "free slot availability now" may refer to a time context. The context may be used with the intent to generate the soft-query.

The method 300 includes generating 360 micro-queries. The micro-queries may be specific to individual applications or data stores to access and retrieve the relevant information. To retrieve the information from a data source, a query may be written. In the case of multi-modality conversational queries, the system may retrieve information from one or more data sources, and a query may be generated for each such data source. Moreover, for each modality input, they system may convert the inputs into a form that the virtual assistant (VA) engine understands. Thus, the soft-query in the invention is divided into a set of micro-queries, which are used to retrieve the information from multiple sources. In an example, "this" gesture may be converted into its corresponding equivalent form, and could be a location. This determination may be based on the application, for example an execution context. Micro-queries are generated to determine such processing.

Generating 360 the micro-queries may include dividing the query into multiple meaningful segments. Generating the micro-queries 360 may include identifying a transformation to process by a VA engine for different modality inputs. Generating 360 the micro-queries may include identifying the data sources from which the data are to be retrieved. Generating 360 the micro-queries may include identifying the associations between the modality components such as "key phrases," "spoken phrases," "objects," "context," and "intents" in the sequence of conversational inputs. Generating 360 the micro-queries may include considering responses from a previous multi-modality query in the same conversation, for example a lot of previous responses with multi-modality objects, entities, intents, context, or any combination thereof. Generating 360 the micro-queries may include formulating the micro-queries based on the obtained results.

The method 300 includes executing 370 the micro-queries by the soft-agent on processor 220 of FIG. 2 and receiving micro-query results at least in part on the multi-modality query. The method 300 includes outputting 380 the results. Outputting 380 the results may include providing text output, speech output, visual output, or any combination thereof, of the results. The outputted results may be ordered, for example, based on the relevance scores of the micro-queries results with respect to soft-query. The outputted results may be displayed as ordered results in an interactive dashboard or user interface. In some embodiments, the user may update, refine, narrow down, or any combination thereof, the requests based on the results produced by the system for further evaluating and processing.

Figure 4:
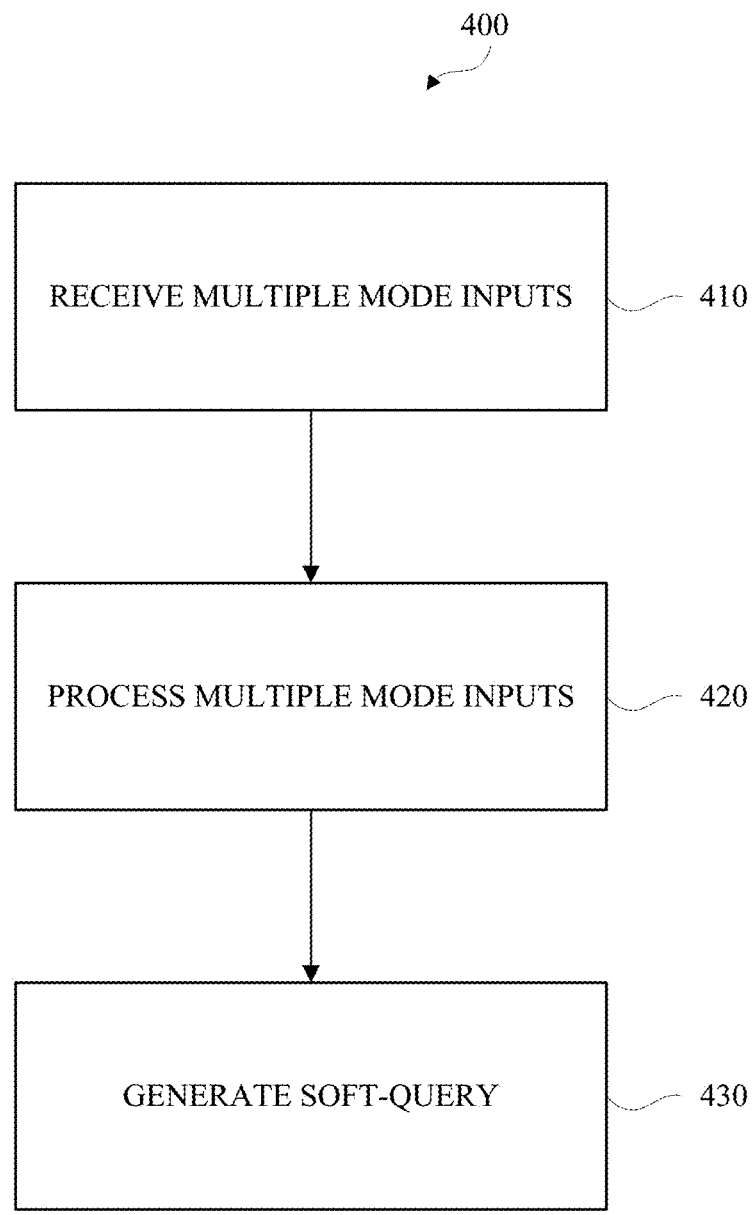
FIG. 4 is a flowchart of another example of a method for processing a multi-modality input with run-time virtual assistant engine in accordance with embodiments of this disclosure.

FIG. 4 is a flowchart of another example of a method 400 for processing a multi-modality input with run-time virtual assistant engine in accordance with embodiments of this disclosure. The method 400 may process multi-modality input that includes speech, text, touch, image, video, scanned object, document, or any combination thereof. A system such as the system 100 shown in FIG. 1 or the system 200 shown in FIG. 2 may be configured to perform the method 400.

As shown in FIG. 4, the method 400 includes receiving 410 multi-modality inputs. The method 400 includes processing 420 the multi-modality inputs using top level grammar and run-time framework comprising tools specific to natural language processing, computer vision, speech processing, machine learning, or any combination thereof. The multi-modality linguistics and grammar identifies the entities and objects involved in the multi-modality input and establishes relationships between and among entities and objects in order to populate a soft-query. In this context, the entities and objects refer to the same elements in the multi-modality query. Both are elements, however, the difference is based on the identified modality. In the text input, the words related to, for example, person names and location names, payment, price, things, and the like represent entities, whereas in an image input, a face or a bike in an image represent objects. Relationships between and among entities and objects may be established from the multi-modality query. For example, in a query "please book a car to reach 'here,'" the car is an entity, 'here' is an object in the map (for example, a touch-based entity (location) on the map using an interactive touch display), current location of a user is an entity, and 'book' is a relationship between the car and source and destination locations.

The method 400 includes generating 430 a soft-query based on the output for retrieving information from applicable application and data stores. The output for retrieving information from applicable application and data stores may be based on a desired or inferred outcome, for example, what the user is looking for. When the results are received, the results may be sorted, for example, based on the relevance scores of the micro-queries results with respect to soft-query). The micro-query score is a relevance score. The soft-query may be divided into multiple micro-queries based on the context, intent, modality entities, objects and also previous responses in the same conversation. The micro-queries are generated from the soft-query. The relevance score is based on the closeness between the generated micro-query and the intended outcome, which may be determined based on the learning patterns discovered using ML algorithms on historical data and domain-specific and/or application details. The ordered results may be presented or displayed in the interactive dashboard or user interface. In some embodiments, the ordered results may be presented or displayed along with other information such as suggestions or recommendations to a multi-modality query of the user.

Figures 5A, 5B:
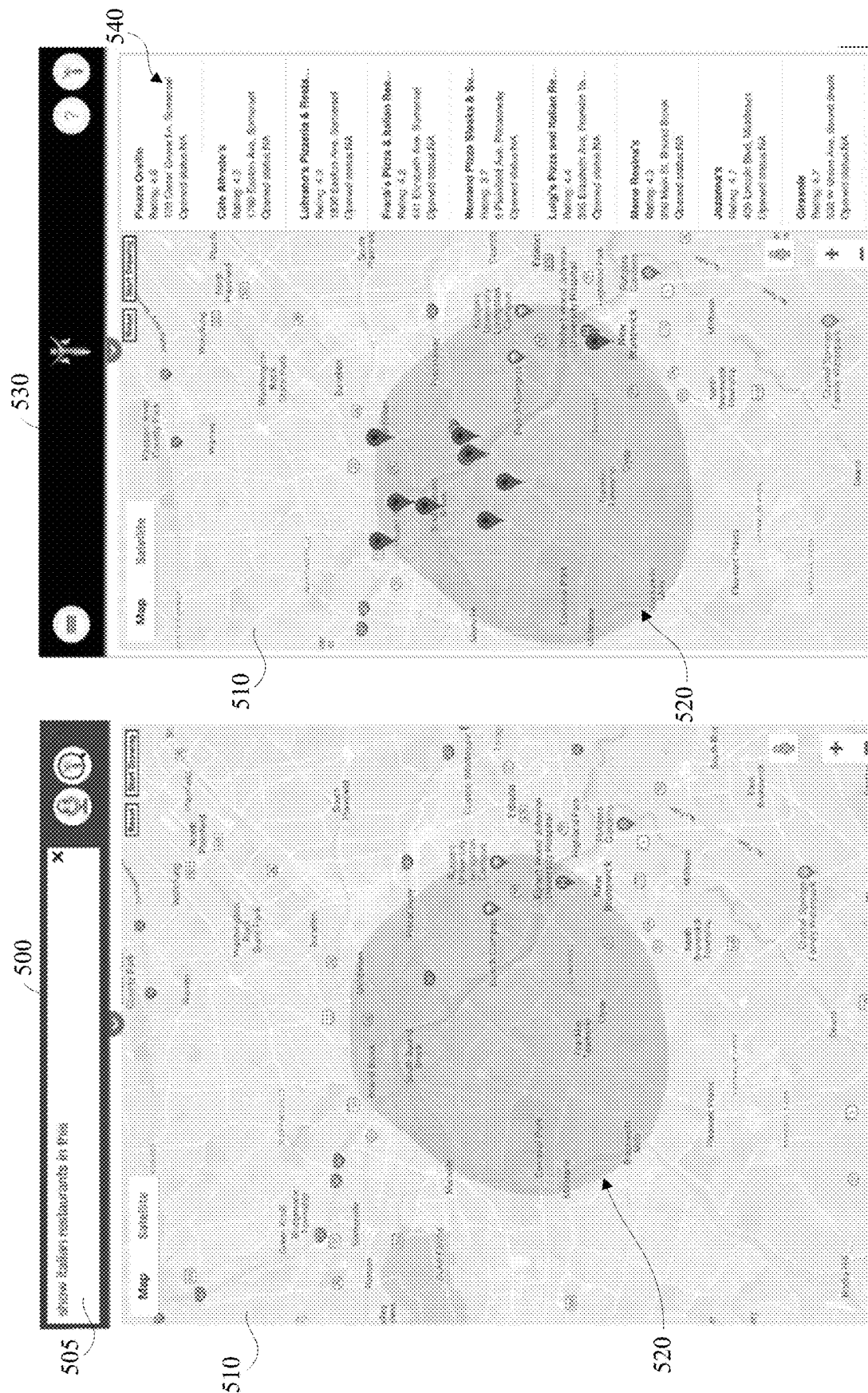
FIG. 5A is a diagram of an example display showing a multi-modality input in accordance with embodiments of this disclosure.
FIG. 5B is a diagram of an example display showing a multi-modality interaction resulting in an output for a search criterion on a corresponding map with a touch and speech input in accordance with embodiments of this disclosure.

FIG. 5A is a diagram of an example display 500 showing a multi-modality input in accordance with embodiments of this disclosure. FIG. 5A is an example of a search criterion on a corresponding map with a 'touch' and 'speech' input. The speech input is converted to text, and the text of the speech input is displayed in window 505. An object 520 shows the geometric region drawn by user by dragging the finger along the curve. In this example, the user speech input is "show Italian restaurants in this" and the finger touch input is the circle drawn around the 'Newark' location. The system is configured to indicate the drawing on the display by shading the area or any other means.

FIG. 5B is a diagram of an example display 530 showing the multi-modality interaction shown in FIG. 5A resulting in an output for a search criterion on a corresponding map with a touch and speech input in accordance with embodiments of this disclosure. FIG. 5B shows a results output of an example for a search criterion on a matching map with a 'touch' and 'speech' input. As shown in FIG. 5B, the object 510 shows a map with restaurants tagged and annotated for a users' speech input "show Italian restaurants in this" and finger touch input at 'Newark' location. The object 520 shows the annotated results for the multi-modality query "show me the Indian restaurants in this which are above rating 4" with respect to drawn object 520 in side panel 540.

In another embodiment, the system 200 of FIG. 2 may also perform other queries such as "book Uber cab for 5 persons from here to this restaurant." In this example, the system 200 may determine the soft-query context with respect to 'here' and 'this' by considering the neighborhood queries that are placed before or after the current query request. The system 200 may also be configured to determine a suitable cab that is comfortable for seating 5 persons. The neighborhood queries may be determined based on a parameter. The number of neighborhoods, for example K, is a parameter. The parameter may be application specific. For example, where K=2, the neighborhoods include the immediate two previous queries of the current query in execution and two past queries that are posed after a 'similar' query in the past. In some cases, the latter may be zero when there are no similar queries executed in the past.

Figure 6:
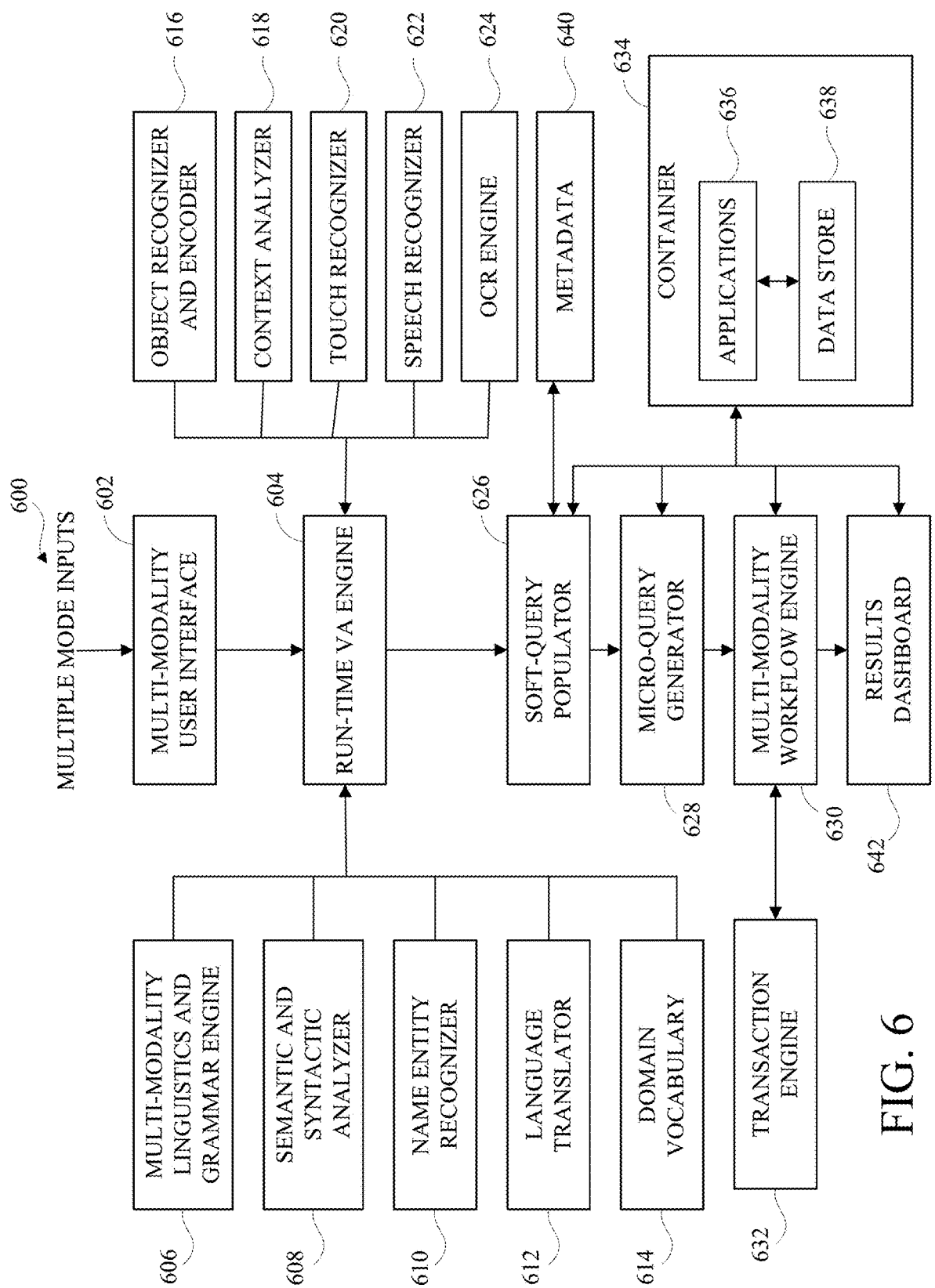
FIG. 6 is a block diagram of an example of a system in accordance with embodiments of this disclosure.

FIG. 6 is a block diagram of an example of a system 600 in accordance with embodiments of this disclosure. The input to the system 600 may include a multi-modality input that comprises one or more requests by a registered user. The components shown in FIG. 6 may be implemented on a single computing device, or on multiple computing devices.

In the example shown in FIG. 6, a multi-modality user interface 602 is configured to receive a multi-modality input that includes text, speech, gesture, image, scanned object, touch, or any combination thereof. A run-time VA engine 604 may be configured to process the multi-modality input and generate the meaning and representations to generate a soft-query according to the user requests. For processing multi-modality interactions, the run-time VA engine 604 may be configured to generate the meaning and representations by interacting with a multi-modality linguistics and grammar engine 606, a semantic and syntactic analyzer 608, a named entity recognizer 610, a language translator 612, a domain vocabulary 614, an object recognizer and encoder 616, a context analyzer 618, a touch recognizer 620, a speech recognizer 622, and an optical character recognition (OCR) engine 624, to generate soft-query populations in real-time. In addition, the run-time VA engine 604 may be configured to determine the intent of the user requests and determine the focus of the user intention while generating soft-query populations. The system 600 may be configured to select one of more soft-queries among the soft-query populations which are in top-k ranking and relevance to the user requests and applicable applications or data store.

Meaning expressed by different modes in the input request and the corresponding output may be represented and translated into a common language using multi-modality linguistics and grammar engine 606. For example, for a soft query comprising the speech "effect areas of recent hurricanes here" and a scanned photo of an effect area may display the affected areas on a geographical map that occurred in the recent past by accessing the relevant information from various data sources. The multi-modality linguistics and grammar engine 606 may be configured to determine the meaning of different modes, recognize the multi-modality entities among one or more input modes, and establish the relationship between these entities to form a soft-query. A grammar related visual expression (e.g., a photo) may provide the ways in which an image works for the visual input. Locative prepositions in multi-modality language may function similar to foreground or background in images. Comparatives in language may function similar to sizing and placement in images. Such linguistic details along with actions expressed by verbs in speech may be expressed by vectors to form a soft-query.

The language translator 612 may be configured to translate the text input in multiple languages present in the input and/or output into a standard language configured for the user or any other language specified by the user. For example, when a user sketch covering a portion of text on the output screen by a finger and ask to translate into Spanish, the run-time VA engine 604 may identify the portion of the text, convert into Spanish, display on the Spanish text in the output screen and produce audio of that text in Spanish.

The object recognizer and encoder 616 may be configured to identify the objects and encode them into a vector to form a query in a scanned image or photograph. Examples of the objects include, but are not limited to, a scene in the video, a barcode in a scanned image, a sketch drawn on the user interface, and a text segment in a picture. In another embodiment, the object recognizer and encoder 616 may be configured to determine the start and an end of the drawing region sketched by the user.

The context analyzer 618 may be configured to identify the context and situation in the multi-modality input. For example, it may determine the shape of an object along with a location specified by touch and speech "here" to recognize the context of the user request. Touch recognizer 620 and speech recognizer 622 may be configured to identify the touch, gesture, speech, spoken language, and the like in the multi-modality input. The optical character recognition (OCR) engine 624 may be configured to identify and extract the text present in an image part of multi-modality input.

The semantic and syntactic analyzer 608 may be configured to extract entity information from a natural language input and extract relationship information, for example, mapping information that connects text entities extracted by multi-modality linguistics and grammar 606. In an example, parts of speech (POS) tags may be assigned to the natural language input by a POS tagger (not shown).

The system 600 may use the output from run-time VA engine 604 to determine one or more query types, for example, a sketch query, a touch query, a logical query, or the like. In an example, the run-time VA engine 604 may be configured to use heuristics and the domain vocabulary 614 to determine query type. Such heuristics may involve, for example, looking for modality phrases in the input that indicate a sketch+touch query. The system 600 may be configured to refine the soft-query population by coupling with incoming user requests through the multi-modality user interface 602. The domain vocabulary 614 may include various business specific terms/elements and their relationships, and the rules that represent policies of that business. For example, in the banking domain, the terms such as bankruptcy or non-performing assets and the rule that indicates that the equated monthly installment (EMI) not payed for more than three months should be treated as a non-performing asset, may be included as part of the domain vocabulary 614.

In the example shown in FIG. 6, the soft-query populator 626 may be configured to use the output from run-time VA engine 604 to populate a query to be performed on one or more applicable applications and data stores. In addition to information relating to mode types, extracted entity information, and extracted mapping information, the soft-query populator 626 may be configured to use the semantic and syntactic analyzer 608 and the named entity recognizer 610 to process the natural language present in the input to formulate a query. The name entity recognizer 610 may be a module of an NLP toolkit that is configured to identify the entities in a given natural language (i.e., unstructured) text and categorize the entities into pre-defined classes. For example, in an invoice document, "Acme, Inc." may be identified as an entity and categorized into a Company. Further, the metadata 640 related to the applications and data store may be used by the soft-query populator 626 to formulate the query. The metadata 640 may retrieves the metadata from the metadata repository corresponding to the user accessible sources and applications in the container 634. The system 600 may be configured to determine the context switch in the sequence of user inputs, determine the user intent, and further refine the soft-query formulation. The soft-query populator 626 may be configured to extract the features based on the focus determined by the system 600.

The multi-modality workflow engine 630 may be used for context-aware dynamic workflow specification and composition. The multi-modality workflow engine 630 may be configured to specify the workflows and the order of execution of their tasks involved in the micro-queries generated by the micro-query generator 628. The multi-modality workflow engine 630 may be configured to dynamically specify the workflow and instantiate the workflow instances according to the context changes during one or more user interactions that are supplied to the system 600 in sequence. The multi-modality workflow engine 630 may be configured to organize the generated workflow instances and execute the tasks by interacting with the container 634. The container 634 may include the applications 636 and data store 638 that are configured for the user. The system 600 may be configured to dynamically link the soft-query instances to the one or more retrieved metadata instances for linking and executing tasks of one or more micro-queries.

The multi-modality workflow engine 630 may be configured to capture the events that arise during the tasks execution and determine one or more modality-event-context patterns. The multi-modality workflow engine 630 may be configured to determine the micro-query embeddings and perform respective actions by generating new workflow instances according to one or more specified event-condition-action rules corresponding to modality-event-context patterns. In an example, word2Vec may convert each word into a vector, which is known as word embedding. Similarly, a natural language (text) query that consists of a sequence of words may be collectively represented as a vector. This is known as query embedding. In a multi-modality query, each micro-query may include one or more modalities, and may be transformed into its equal vector representation. This is defined as micro-query embedding. The multi-modality workflow engine 630 may be configured to identify the execution call to be made immediately (i.e., immediate binding) or scheduled at a later point of time (i.e., late binding) according to the multi-modality input supplied to multi-modality user interface 602.

The transaction engine 632 may be configured to coordinate the execution of the workflow tasks and the states of the workflow tasks. Examples of the states of workflow tasks may include, for example, ready, wait, committed, aborted, progress, and completed. Any failure transactions may be handled as per the state diagram (not shown) corresponding to each application.

The results dashboard 642 may include a ranking aggregator (not shown) that is configured to consolidate the results (e.g., for presentation to a user) and assign scores as per the relevance to the soft-query or adjust scores if default scores are provided. The results may be displayed in ascending or descending ranking order. The results dashboard 642 may be configured to dynamically stitch the outputs from tasks execution and display the results and/or spoken form. For example, the receipts of various payments may be stitched as a single compiled and aggregated receipt. In another example, the priority tasks in the next 2 hours from a user calendar may be listed and based on the user response, next requests, and timestamps, such that the tasks are re-organized by priority on-the-fly. The results dashboard 642 may be configured to summarize and annotate the results. For example, the text results may be summarized using text summarization techniques and sent as an email to a specified user.

In the example shown in FIG. 5B, the search results are presented in a user interface. The user interface may also present comparative results associated with a user request. For example, the results dashboard 640 may present sorted, qualified results. The results dashboard 640 may include a results sorter that sorts qualified results (e.g., in descending order of relevance) according to scores obtained based on the relevance. Alternatively, results can be unsorted, sorted in some other way, or sorted at some other location in the system.

In practice, exemplary systems described herein such as systems 100, 200, and 600 may include additional system components, additional relationships between system components, and the like. The relationships shown between modules within exemplary systems described herein indicate general flows of information in the respective system; other relationships are not shown for the sake of simplicity. Depending on the implementation and the type of processing desired, modules of the system can be added, omitted, split into multiple modules, combined with other modules, and/or replaced with like modules. Generally, the technologies described herein are generic to different operating systems or hardware and can be applied in any variety of environments to take advantage of the described features.

Figure 7:
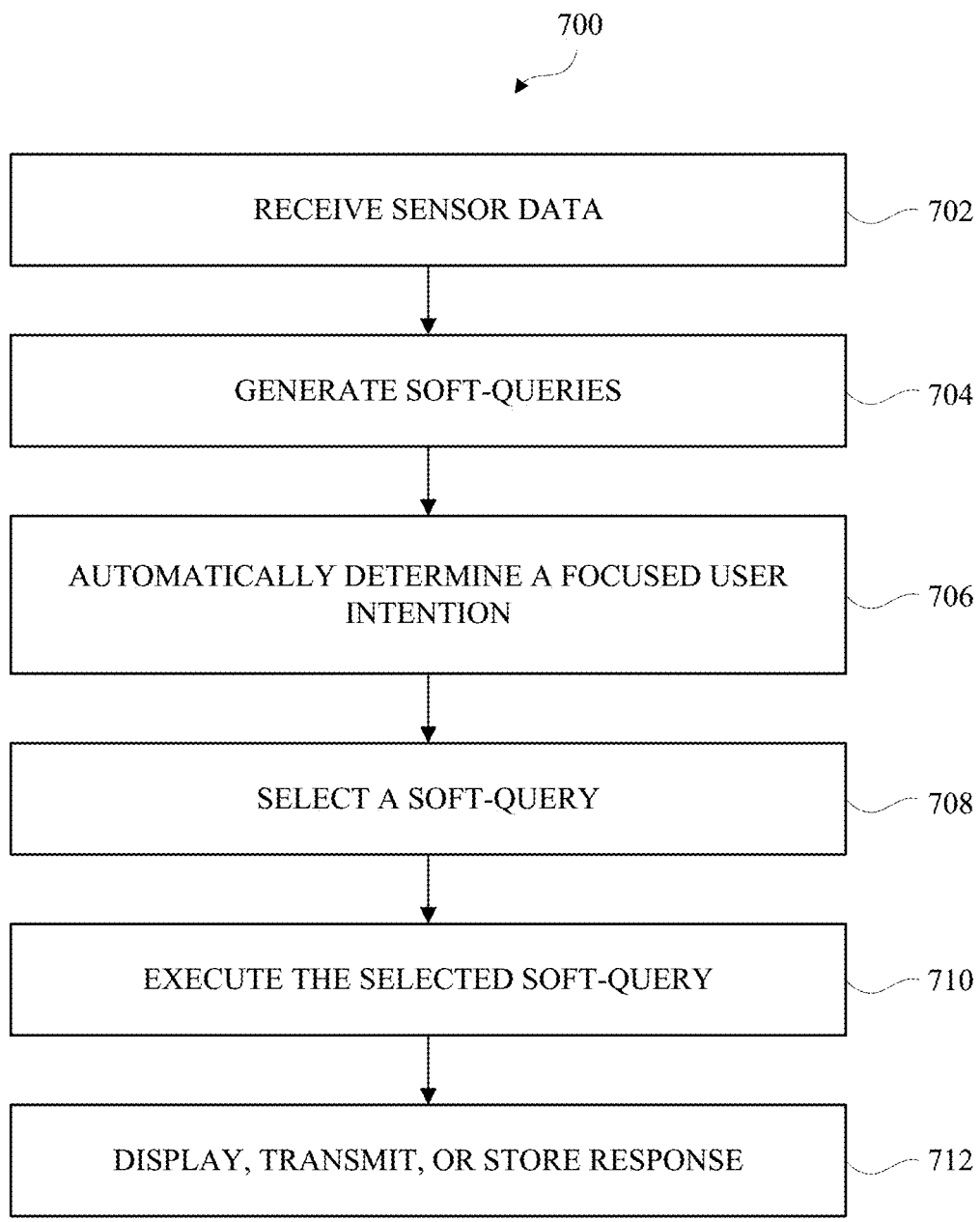
FIG. 7 is a flow diagram of an example method for identifying user focus in accordance with one embodiment.

FIG. 7 is a flow diagram of an example method 700 for identifying user focus in accordance with one embodiment. The method 700 includes receiving 702 sensor data from a one or more sensors. The sensor data may include a user request in multiple mode inputs. The multiple mode inputs may be associated with the one or more sensors to build a query. The multiple mode inputs may include at least two or more of a voice input, an object drawing input, a scanned object input, a text input, or an image input. In an example, an object drawing input may include an identification of a region drawn on an object. An identification of the region may be determined by a start and an end of the region drawn, by a voice input, or both.

The method 700 includes generating 704 one or more soft-queries in real-time using the multiple mode inputs and one or more object encoders. The one or more soft-queries may be associated with a one or more applications and one or more data stores.

The method 700 includes automatically determining 706 a focused user intention from the multiple mode inputs. The focused user intention may be determined based on one or more query intents from one or more user actions through the plurality of sensors of a multi-modality interface. The method 700 may include selecting 708 a soft-query of the one or more soft-queries. The selected soft-query may be based on a rank and relevance associated with a respective application and a respective data store. In some embodiments, the one or more soft-queries may be refined by coupling a sequence of one or more dependent user multi-modality interactions. In some embodiments, the focused user intention and refinement of a soft-query formulation may be determined with respect to the sequence of inputs. Features for determining the focused user intention may be extracted based on one or more multi-modality inputs.

The method 700 includes executing 710 the selected soft-query against the respective data store and the respective application to generate a response. In some embodiments, one or more micro-queries may be generated from the soft-query. The one or more micro-queries may be based on one or more of a context, an intent, a sensor mode input, an object, a data source, an application, a previous user response, or any combination thereof. The variability within the one or more micro-queries may be analyzed. The one or more micro-queries may be executed to obtain one or more results. The results from the one or more micro-queries may be stitched in real-time. The results may include text, and in some embodiments, the method 700 may include summarizing the text of the results. In some embodiments, the summarized text may be translated in a user-specified language through one or more multi-modality interactions. In some embodiments, the one or more micro-queries may be converted into vectors using query2vectors to form query embeddings. Query formalism may be accelerated using the query embeddings based on the context, the intent, the sensor mode input, the object, the data source, the application, the previous user response, or any combination thereof.

The method 700 includes displaying, transmitting, storing, or any combination thereof, the response at 712. The response may be a multiple mode response. For example, the response may be displayed in an interactive dashboard and transmitted as an audible text-to-speech response. The audible text-to-speech response may be transmitted as an audio signal. The audio signal may be complimentary to or associated with the displayed response.

In some embodiments, metadata may be retrieved from a metadata repository corresponding to accessible sources and applications of a user. The soft-query instances may be dynamically linked to one or more metadata instances of the retrieved metadata.

In some embodiments, a context-aware dynamic workflow specification may be generated. In addition, one or more workflow instances may be generated. One or more modality-event-context patterns and embeddings may be determined for a micro-query. One or more active transactions of workflow tasks and workflow instances may be executed in real-time. Immediate and late bindings of the workflow tasks and one or more parameters that correspond to at least one or more of the modality-event-context patterns may be generated. In some embodiments, multiple multi-modality driven workflow instances may be arranged. One or more soft-query context shifts may be determined in real-time. The workflow instances tasks may be updated. In some embodiments, new workflow instances may be created. In some embodiments, information may be retrieved by ranking top-k queries and associated results.

In some embodiments, a meta-data repository for a new and dynamic data source structure may be created and augmented. For example, in some enterprises, new data sources may be added when new applications or solutions are deployed. The metadata repository may also be updated to reflect the addition of the new sources. As the queries may span to multiple data sources, including the newly added data sources such as internet/web data sources, the new data source structures from the enterprise applications may be dynamically created and updated (i.e., augmented) for the metadata repository. In an example, the augmentation may be adding new data source structures such as a database schema, workflow schema, rules, constraints, or any combination thereof. Once these data source structures are augmented, the data/information required (i.e., results) for subsequent soft-queries, as needed, may also be queried on the augmented data sources with the support of the updated metadata repository.

Having described and illustrated the principles with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein.

Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine-readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory. Modules can be defined by executable code stored on non-transient media.

The following description is presented to enable a person of ordinary skill in the art to make and use the embodiments and is provided in the context of the requirement for a obtaining a patent. The present description is the best presently-contemplated method for carrying out the present embodiments. Various modifications to the embodiments will be readily apparent to those skilled in the art and the generic principles of the present embodiments may be applied to other embodiments, and some features of the present embodiments may be used without the corresponding use of other features. Accordingly, the present embodiments are not intended to be limited to the embodiments shown but are to be accorded the widest scope consistent with the principles and features described herein.

What is claimed is:

1. A method for identifying user focus, the method comprising:
   receiving sensor data from a plurality of sensors, wherein the sensor data comprise a user request in multiple mode inputs associated with the plurality of sensors to build a query;
   generating a plurality of soft-queries in real-time using the multiple mode inputs and a plurality of object encoders, wherein the plurality of soft-queries are associated with a plurality of applications and a plurality of data stores;
   automatically determining a focused user intention from the multiple mode inputs;
   selecting a soft-query of the plurality of soft-queries based on a rank and relevance associated with a respective application and a respective data store;
   executing the selected soft-query against the respective data store and the respective application to generate a response; and
   displaying the response in an interactive dashboard.

2. The method of claim 1, wherein the response is a multiple mode response, wherein the method further comprises:
   transmitting the response as an audio signal, wherein the audio signal is complimentary to the displayed response.

3. The method of claim 1, wherein the multiple mode inputs include at least two or more of a voice input, an object drawing input, a scanned object input, a text input, or an image input.

4. The method of claim 3, wherein the object drawing input includes an identification of a region drawn on an object, wherein the identification is determined by a start and an end of the region or by the voice input.

5. The method of claim 1, wherein the focused user intention is determined based on one or more query intents from one or more user actions through the plurality of sensors of a multi-modality interface.

6. The method of claim 1 further comprising:
   refining the plurality of soft-queries by coupling a sequence of one or more dependent user multi-modality interactions;
   determining the focused user intention and refinement of a soft-query formulation with respect to the sequence of inputs; and
   extracting features for determining the focused user intention based on one or more multi-modality inputs.

7. The method of claim 1 further comprising:
   generating one or more micro-queries from the soft-query based on one or more of a context, an intent, sensor mode input, an object, a data source, an application, or a previous user response;
   analyzing a variability within one or more micro-queries;
   executing the one or more micro-queries to obtain results; and
   stitching the results from one or more micro-queries in real-time.

8. The method of claim 7 further comprising:
   summarizing text of the results; and
   translating the summarized text in a user-specified language through one or more multi-modality interactions.

9. The method of claim 7 further comprising:
   converting the one or more micro-queries into vectors using query2vectors to form query embeddings; and
   accelerating query formalism using the query embeddings based on the context, the intent, the sensor mode input, the object, the data source, the application, or the previous user response.

10. The method of claim 1 further comprising:
    retrieving metadata from a metadata repository corresponding to accessible sources and applications of a user; and
    dynamically linking soft-query instances to one or more metadata instances of the retrieved metadata.

11. The method of claim 1 further comprising:
    generating a context-aware dynamic workflow specification;
    generating a plurality of workflow instances; and
    determining one or more modality-event-context patterns and embeddings for a micro-query.

12. The method of claim 11 further comprising:
    executing a plurality of active transactions of workflow tasks and workflow instances in real-time; and
    generating immediate and late bindings of the workflow tasks and one or more parameters that correspond to at least one or more of the modality-event-context patterns.

13. The method of claim 11 further comprising:
    arranging multiple multi-modality driven workflow instances;
    determining one or more soft-query context shifts in real-time; and
    updating the workflow instances tasks or creating new workflow instances.

14. The method of claim 1 further comprising:
    retrieving information by ranking top-k queries and associated results; and
    creating and augmenting a meta-data repository for a new and dynamic data source structure.

15. A computing apparatus comprising:
    a processor;
    a plurality of sensors; and
    a memory storing instructions that, when executed by the processor, configure the apparatus to:
      receive sensor data from the plurality of sensors, wherein the sensor data comprise a user request in multiple mode inputs associated with the plurality of sensors to build a query;
      generate a plurality of soft-queries in real-time using the multiple mode inputs and a plurality of object encoders, wherein the plurality of soft-queries are associated with a plurality of applications and a plurality of data stores;
      automatically determine a focused user intention from the multiple mode inputs;
      select a soft-query of the plurality of soft-queries based on a rank and relevance associated with a respective application and a respective data store;
      execute the selected soft-query against the respective data store and the respective application to generate a response; and
      display the response in an interactive dashboard.

16. The computing apparatus of claim 15, wherein the plurality of sensors include at least two of an interactive touch display, a microphone, a global positioning system (GPS) sensor; an accelerometer, or a biometric sensor.

17. The computing apparatus of claim 15, wherein the response is a multiple mode response, wherein the method further comprises:

transmit the response as an audio signal, wherein the audio signal is complimentary to the displayed response.

18. The computing apparatus of claim 15, wherein the multiple mode inputs include at least two or more of a voice input, an object draw input, a scanned object input, a text input, or an image input.

19. The computing apparatus of claim 18, wherein the object drawing input includes an identification of a region drawn on an object, wherein the identification is determined by a start and an end of the region or by the voice input.

20. The computing apparatus of claim 15, wherein the focused user intention is determined based one or more query intents from one or more user actions through the plurality of sensors of a multi-modality interface.

* * * * *